(12) United States Patent
Stelle, IV et al.

(10) Patent No.: US 12,525,698 B2
(45) Date of Patent: Jan. 13, 2026

(54) SMART MOUNT FOR COUPLING AN ANTENNA ALIGNMENT DEVICE TO AN ANTENNA

(71) Applicant: Viavi Solutions Inc., San Jose, CA (US)

(72) Inventors: Raleigh Benton Stelle, IV, Indianapolis, IN (US); Thomas Sevilla, Miramar, FL (US)

(73) Assignee: Viavi Solutions Inc., Chandler, AZ (US)

( * ) Notice: Subject to any disclaimer, the term of this patent is extended or adjusted under 35 U.S.C. 154(b) by 125 days.

(21) Appl. No.: 17/505,162

(22) Filed: Oct. 19, 2021

(65) Prior Publication Data

US 2023/0117595 A1  Apr. 20, 2023

(51) Int. Cl.
| | | |
|---|---|---|
| *H01Q 1/12* | (2006.01) | |
| *G01L 1/22* | (2006.01) | |
| *G01L 5/00* | (2006.01) | |
| *G01P 15/00* | (2006.01) | |
| *G08B 7/06* | (2006.01) | |
| *G08B 21/18* | (2006.01) | |

(52) U.S. Cl.
CPC ............... *H01Q 1/12* (2013.01); *G01L 1/22* (2013.01); *G01L 5/0033* (2013.01); *G01P 15/00* (2013.01); *G08B 7/06* (2013.01); *G08B 21/18* (2013.01)

(58) Field of Classification Search
CPC ...... H01Q 1/12; H01Q 1/1207; H01Q 1/1214; H01Q 1/1221; H01Q 1/1228; H01Q 1/125; H01Q 1/18; H01Q 1/185; H01Q 1/20; H01Q 1/246; G01L 1/22; G01L 5/0019; G01L 5/0033; G01L 5/1627; G01P 15/00; G08B 7/06; G08B 21/18
USPC .................................................. 340/665, 655
See application file for complete search history.

(56) References Cited

U.S. PATENT DOCUMENTS

| | | | | |
|---|---|---|---|---|
| 4,334,226 | A  * | 6/1982 | Eguchi ..................... | H01Q 1/18 342/422 |
| 5,977,922 | A  * | 11/1999 | Hemmingsen, II .... | H01Q 1/125 33/270 |
| 9,080,438 | B1 * | 7/2015 | McCoy ................. | E21B 47/009 |
| 2002/0084948 | A1 * | 7/2002 | Watson .................... | H01Q 3/02 343/882 |
| 2003/0071762 | A1 * | 4/2003 | Tulloch ................ | H01Q 19/132 343/882 |
| 2007/0052607 | A1 * | 3/2007 | Dwornik ................ | H04B 1/086 343/757 |

(Continued)

*Primary Examiner* — Brian A Zimmerman
*Assistant Examiner* — Thang D Tran
(74) *Attorney, Agent, or Firm* — DLA PIPER LLP US (57) ABSTRACT

An example smart antenna mount may couple an antenna alignment device with an antenna. The smart antenna mount may include sensors such as strain gauges and accelerometers, and an electronic circuitry to communicate the measurements from the sensors. The measurements are received by the antenna alignment device, which may perform further operations to determine whether the coupling is within desired bounds. If within desired bounds, the antenna alignment device may generate an indication of a normal coupling, e.g., by activating a first colored (e.g., green) LED. If the coupling is outside the desired bounds, the antenna alignment device may indicate an alarm condition, e.g., activating a second colored (e.g., red) LED or generating an audible signal.

19 Claims, 9 Drawing Sheets

(56) References Cited

U.S. PATENT DOCUMENTS

| | | | |
|---|---|---|---|
| 2009/0195467 A1* | 8/2009 | Vassilakis | H01Q 1/1228 343/765 |
| 2009/0201203 A1* | 8/2009 | Le Sage | G01S 19/53 342/357.29 |
| 2010/0279751 A1* | 11/2010 | Pourseyed | H04B 1/3838 455/575.7 |
| 2013/0193970 A1* | 8/2013 | Alexson | G01R 33/323 324/309 |
| 2013/0271320 A1* | 10/2013 | Trerise | H01Q 1/1257 342/359 |
| 2013/0305842 A1* | 11/2013 | Meuter | G01L 3/108 73/862.192 |
| 2014/0266925 A1* | 9/2014 | Dalmazzo | G01S 19/14 343/702 |
| 2015/0381293 A1* | 12/2015 | Hardy | H04B 17/318 455/67.7 |
| 2016/0211576 A1* | 7/2016 | Vassilakis | H01Q 1/1228 |
| 2017/0192089 A1* | 7/2017 | Parker | F41H 13/0075 |
| 2018/0062246 A1* | 3/2018 | Hershey | H01Q 1/1242 |
| 2018/0287695 A1* | 10/2018 | Zacharia | H04B 7/18517 |
| 2020/0161757 A1* | 5/2020 | Henry | H01Q 21/20 |
| 2020/0333192 A1* | 10/2020 | Takase | G01K 1/14 |
| 2020/0343619 A1* | 10/2020 | Burdick | H04B 7/18513 |
| 2020/0343983 A1* | 10/2020 | Hardy | H04B 17/318 |
| 2021/0013829 A1* | 1/2021 | Plesniak | H02S 20/32 |
| 2021/0184332 A1* | 6/2021 | Wattwood | H01Q 1/125 |
| 2021/0328322 A1* | 10/2021 | Walker | F16B 2/12 |

\* cited by examiner

SMART MOUNT FOR COUPLING AN ANTENNA ALIGNMENT DEVICE TO AN ANTENNA

BACKGROUND

Modern communication systems rely heavily on wireless signals transmitted and received by antennas. On the transmit side, antennas receive fluctuating electrical currents through wires from connected circuitry and generate wireless signals as electromagnetic fields corresponding to the fluctuating electrical currents. On the receive side, antennas convert electromagnetic fields of the received wireless signals to electrical currents carried through wires to the connected circuitry. Because of directional oscillation of electrical and magnetic fields, wireless signaling through the transmittal and receipt of electromagnetic fields is inherently directional: heavily influenced by the location of the signal source, multipathing, beamforming, and/or other aspects associated with electromagnetic fields and electromagnetic radiation. Therefore, for an optimal bandwidth and signal strength, antennas—both on the transmit and receive sides—may require precise alignments with respect to each other.

The alignments are generally performed using an antenna alignment device. The antenna alignment device is coupled to an antenna to measure the antenna's alignment parameters such as roll, tilt, and azimuth. This coupling may have to be stable and within desired bounds for an optimal measurement of the parameters. Indeed, the underlying assumption for such measurement is that the coupling does not impart significant variation to the measured parameters. This is because the alignment parameters are actually measured for the antenna alignment device and then deemed to be the alignment parameters for the antenna.

The current approach to determining whether a coupling is within desired bounds is a manual process. A user (e.g., a technician) may rely on his or her experience and judgement ("fingertip feeling") to decide that the coupling is proper. This approach is inherently subjective, and, by the virtue of being dependent on human whim and preferences, introduces a large variability in its outcome. This large variability of the measurement across different antennas and/or the measurement for a single antenna across different times, makes the manual approach less than desirable.

A significant improvement for coupling devices between an antenna alignment device and an antenna is therefore desired.

SUMMARY

Embodiments disclosed herein attempt to solve the aforementioned technical problems and may provide other solutions as well. An example smart antenna mount disclosed herein may couple an antenna alignment device with an antenna. The smart antenna mount may include sensors such as strain gauges and accelerometers, and an electronic circuitry to communicate the measurements from the sensors. The measurements are received by the antenna alignment device, which may perform further operations to determine whether the coupling is within desired bounds. If within desired bounds, the antenna alignment device may generate an indication of a normal coupling, e.g., by activating a colored (e.g., green) LED. If the coupling is outside the desired bounds, the antenna alignment device may indicate an alarm condition, e.g., by activating a different colored (e.g., red) LED and or generating an audible signal.

In an embodiment, a mount configured to couple an antenna alignment device to an antenna is provided. The mount may comprise a clamp configured to engage with an external surface of the antenna and maintain coupling between the antenna alignment device and the antenna; one of more sensors configured to measure mechanical forces imparted by the surface of the antenna to corresponding portions of the clamp; one or more accelerometers configured to determine an orientation of the clamp; and electronic circuitry configured to transmit data indicating the measured mechanical forces and the determined orientation to a receiving device, for the receiving device to determine whether the coupling between the antenna alignment device and the antenna is within predetermined bounds.

In another embodiment, a system is provided. The system may comprise an antenna alignment device; a mount configured to couple the antenna alignment device to an antenna and comprising: a clamp configured to engage with an external surface of the antenna and maintain coupling between the antenna alignment device and the antenna; one of more sensors configured to measure mechanical forces imparted by the surface of the antenna to corresponding portions of the clamp; and one or more accelerometers configured to determine an orientation of the clamp. The antenna alignment device is configured to: receive data indicating the measured mechanical forces and the determined orientation; and determine, based on the received data, whether the coupling between the antenna alignment device and the antenna is within predetermined bounds.

DETAILED DESCRIPTION OF SEVERAL EMBODIMENTS

Consistency in coupling an antenna alignment device and an antenna is desired. The existing manual approach is too subjective—dependent upon a user's experiences and preferences, and other human factors—that introduces a large variability to its outcome. Described herein are examples of smart mounts that attempt to reduce this variability and therefore provide the desired consistent coupling.

To that end, the smart mounts described herein may include sensors and electronic circuitry controlling the sensors. The sensors may measure different attributes of the coupling and may include: a strain gauge or a pressure sensor, which may measure a push force being imparted to the mount, the strain gauge or a pull force sensor may measure a pull force being imparted to the mount; and an accelerometer, which may measure the orientation of the mount. Measurements generated by the strain gauge, the pressure sensors, and the pull force sensors may indicate the tightness with which the corresponding portions of the mount are engaged to the antenna or the antenna alignment device. These measurements may therefore be used to achieve consistent tightness across different antenna alignment events. Measurements generated by the accelerometer may be compared to the measurements generated by the accelerometer within the antenna alignment device itself. If the measurements are sufficiently similar, the smart mount may have a similar and desired orientation as the antenna alignment device.

An example of the smart mount may comprise a lip clamp. The lip clamp may include a first lip and a second lip interconnected by a bolt, each lip frictionally engaging a portion of antenna body. The antenna body may impart a push force to the lips, which may be measured by strain gauge or a pressure sensor. This push force may indicate tightness of the frictional engagement. The frictional engagement of the lips may also impart a pull force on the bolt. The strain gauge or a pull force sensor may measure the pull force, which also may indicate the tightness of the frictional engagement. This tightness may be consistently maintained across different couplings.

Another example of the smart mount may comprise an extension clamp. The extension clamp may have a pair of posts that on one side may be rotatably coupled to a base that may receive the antenna alignment device. On the other side, the posts may be screwed to a bracket that may engage a portion of the antenna body. The tightness of the screws may determine the tightness of the coupling, and the tightness of the screws may be measured using a pull force sensor or a strain gauge. Based on the measurements, the tightness may be consistently maintained across different couplings.

Yet another example of the smart mount may comprise a strap clamp. The strap clamp may have one or more straps that may wrap around the antenna body. The straps may be tightened using a ratchet mechanism, and the tightness may be measured by a pull force sensor or a strain gauge at the bases of the straps. In other words, the pull force sensor or the strain gauge may measure how tightly the straps pull the bases. Based on these measurements, the tightness may be consistently maintained across different couplings.

The antenna alignment device may receive the measurements from the sensors and determine whether the coupling is within desirable bounds. The desirable bounds may include, for example, a tolerance range of tightness or a tolerance difference in tightness between two different poles or straps. The desirable bounds may be predetermined (e.g., being manually entered by the user) and stored in the memory of the antenna alignment device. In addition to the data from the sensors, the antenna alignment device may receive orientation data from one or more accelerometers in the smart mount. The received orientation data may be compared with orientation data generated by accelerometers within the antenna alignment device itself. Similarity in the orientation data may indicate that the coupling is within the desired bounds. If the antenna alignment device determines that the coupling is within the desired bounds, the antenna alignment device may generate an indication such as activating a first colored (e.g., green) LED or showing a message on its display. If the antenna alignment device determines that the coupling is outside of the desired bounds, the antenna alignment device may indicate an abnormal operating condition, e.g., through a second colored (e.g., red) LED. If the abnormal operating condition is significantly out the desired bounds (e.g., coupling being loose likely allowing the antenna alignment device to fall off), the antenna alignment device may indicate an alarm condition, e.g., through an audible signal.

The above types of sensors are merely examples, and other types of sensors with similar functionality should also be considered within the scope of this disclosure. Furthermore, the antenna alignment device performing analysis of the received data and displaying the condition of the coupling is also an example, and other devices (e.g., a mobile device) performing similar functions should also be considered within the scope of this disclosure. Additionally, the measurement of the tightness of coupling between the mount and the antenna is also just an example and measurement of tightness of coupling between the mount and the antenna alignment device should also be considered within the scope of this disclosure.

Figure 1A:
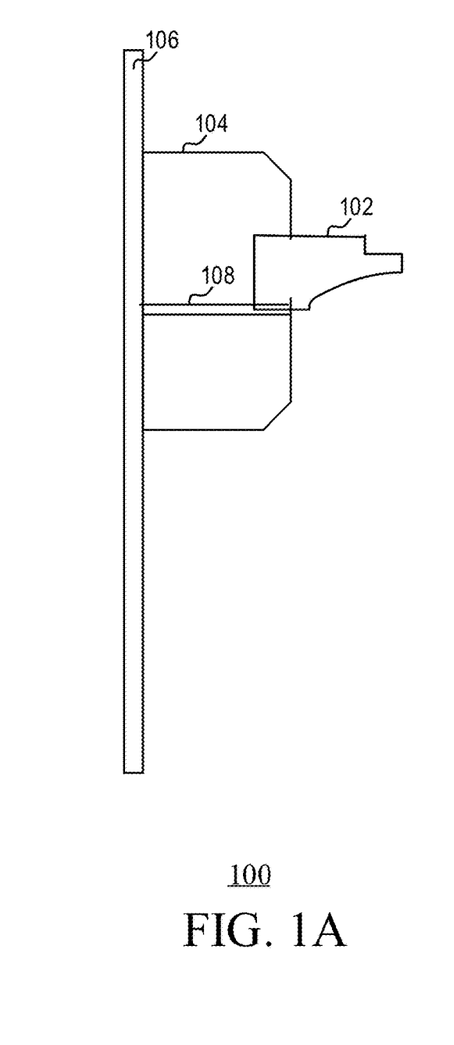
FIG. 1A shows an example environment for antenna alignment, based on the principles disclosed herein.

FIG. 1A shows an example environment 100 for antenna alignment, based on the principles disclosed herein. The example environment 100 includes an antenna 104, which may be disposed on a pole 106. The pole 106 is just an example, and the antenna 104 may be located on any type of structure such as an antenna tower, rooftop, treetop, building wall, vehicle top, satellite, and/or any other type of structure. Furthermore, the antenna 104 can be any type of antenna, including a dome antenna, a loop antenna, a Yagi-type antenna, and/or any type of antenna that may have to be aligned for optimal performance. An antenna alignment device 102 may be used for aligning an antenna 104. The antenna alignment device 102 may output alignment information such as roll, tilt, and/or azimuth. Using the alignment information, a user may align the antenna 104 such that it may have a desired roll, tilt, and/or azimuth.

The antenna alignment device 102 may be coupled to the antenna 104 using a smart mount 108 (also simply referred to herein as a mount). The mount 108 may be any kind of mechanical coupling equipment that may allow the antenna alignment device 102 to be coupled to the antenna 104, decoupled from the antenna 104, or adjusted vis-à-vis the antenna 104. The mount 108 may include any type of coupling mechanism such as lip clamps, extension clamps, and strap clamps. The mount 108 may further include sensors (e.g., mechanical sensors such as strain gauges) that may measure the mechanical properties of the mount 108. A communication interface may transmit the measurements to an external device such as the antenna alignment device 102. The antenna alignment device 102 (or any other external device) may, based on the measurement, may provide an indication as to whether the mount has desired mechanical properties (or the mechanical properties such as tightness is within desirable bounds).

Figure 1B:
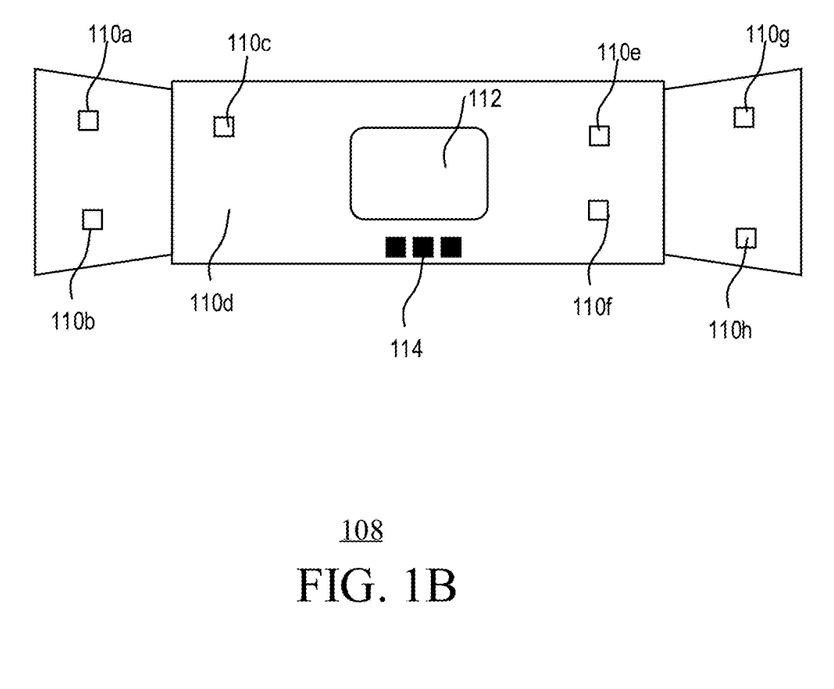
FIG. 1B shows a schematic illustration of a mount coupling an antenna alignment device and an antenna, based on the principles disclosed herein.

FIG. 1B shows a schematic illustration of the mount 108 for coupling the antenna alignment device 102 and the antenna 104, based on the principles disclosed herein. As shown, the mount 108 may comprise, disposed at various locations of the mount, sensors 110*a*-110*h* (collectively or commonly referred to as sensors 110), electronic circuitry 112 coupled to or in communication with the sensors 110, and an interface 114 for wired connections between the mount 108 and the antenna alignment device 102. One or more of these components (e.g., sensors 110) may be disposed in the body of the mount 108, and other components (e.g., the electronic circuitry 112) may be internal to the body (e.g., not within the external form factor) of the mount 108.

The sensors 110 may be any kind of sensors. For instance, the sensors 110 may include a strain gauge to measure strain imparted to the mount 108 by the component (e.g., the antenna 104 or the antenna alignment device 102) attached to the mount 108. The sensors 110 may also include a pressure sensor to measure mechanical pressure imparted on the mount 108 by the attached component. The sensors 110 may also include an accelerometer to measure the orientation of the mount 108 or the orientation of different components within the mount 108. The interface 114 may facilitate wired connections between the antenna alignment device 102 and the mount 108. For instance, the interface 114 may include spring pins that may engage with corresponding coupling structures in a wired connection. Using the wired connection and the spring pins, the antenna alignment device 102 may provide power to the mount 108. The interface 114 may also include pins to implement a serial interface between the mount 108 and the antenna alignment device 102. The serial interface may be used by the mount 108 to transmit data (e.g., sensor data) to the antenna alignment device 102.

In operation, the sensors 110 may measure various mechanical and/or orientation attributes of the mount 108. The sensors 110 may provide, through a wired or wireless connection, the measured attributes to an external device such as the antenna alignment device 102. The antenna alignment device 102 may determine whether the mount 108 is within or out of desired bounds. Feedback may be provided to a user (e.g., an antenna technician) based on the measurements by the sensors 110 and the determination by the antenna alignment device 102. The feedback may include an indication that the mount 108 is within bounds, e.g., a message on a display of the antenna alignment device 102; or the mount 108 is out of bounds, e.g., through a beep or another audible sound by the antenna alignment device 102. The mount 108 being significantly out of bounds may be an alarm condition, which may be indicated by an escalated signal (e.g., a siren like audible signal).

Figure 3A:
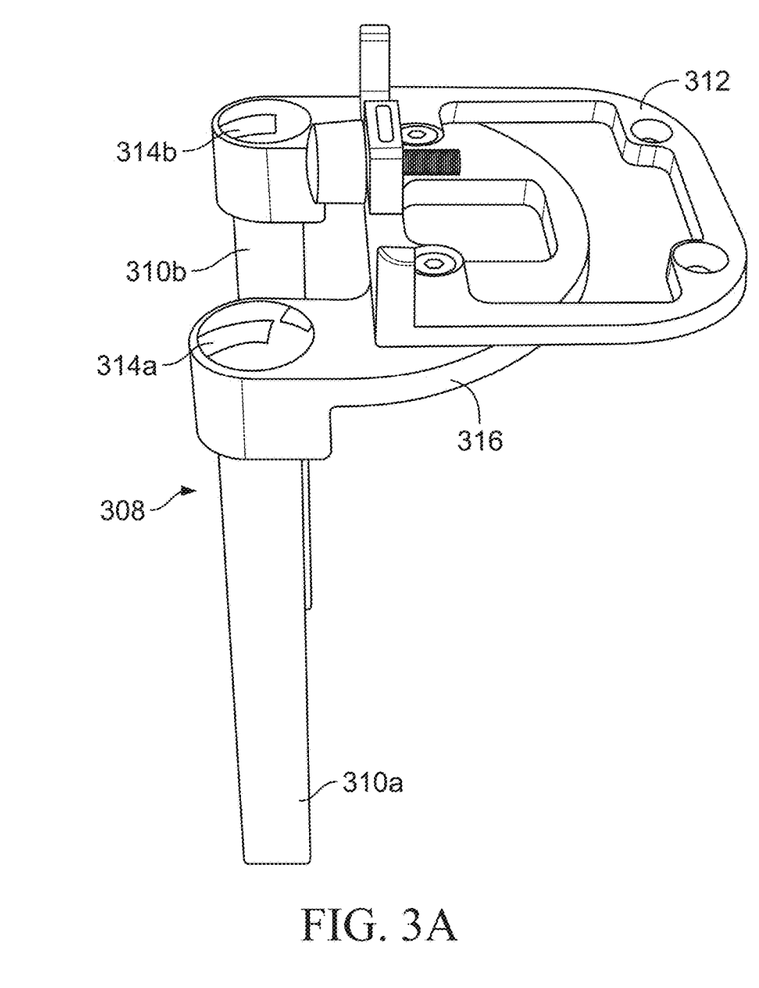
FIGS. 3A-3B show an illustration of an extension clamp, coupling an antenna alignment device with an antenna, based on the principles disclosed herein.
Figure 3B:
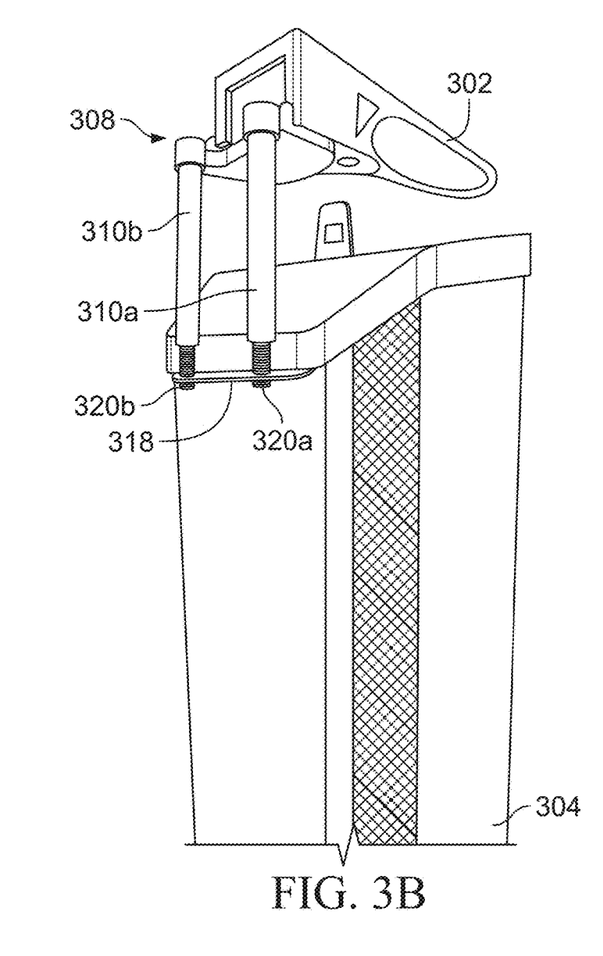
Figure 4A:
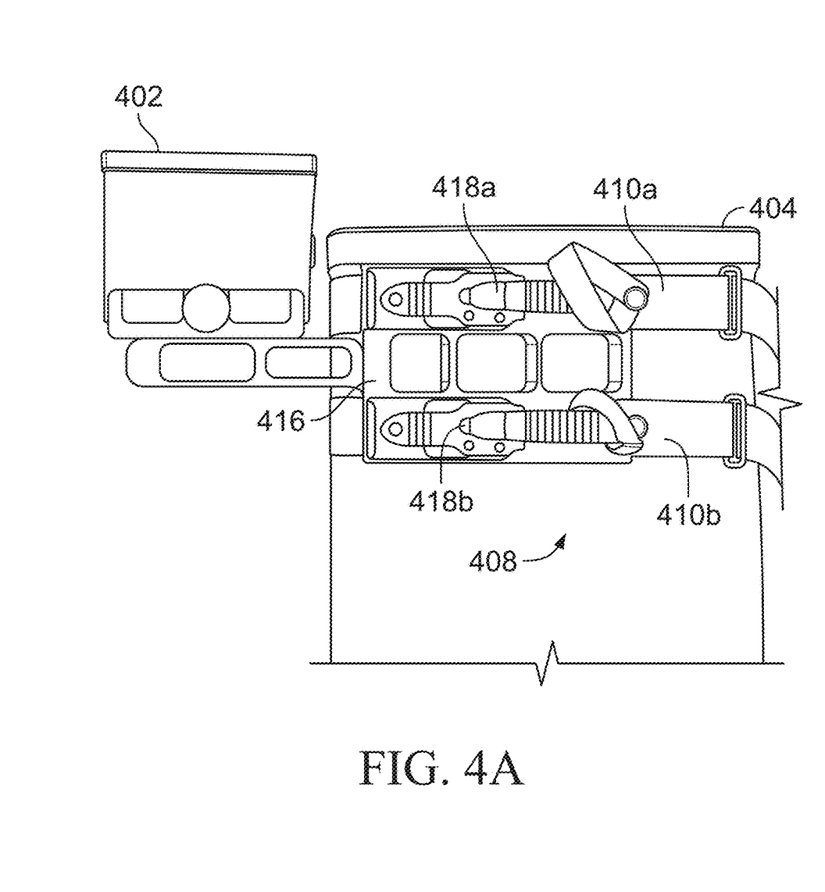
FIGS. 4A-4B show an illustration of a strap clamp coupling an antenna alignment device with an antenna, based on the principles described herein.
Figure 4B:
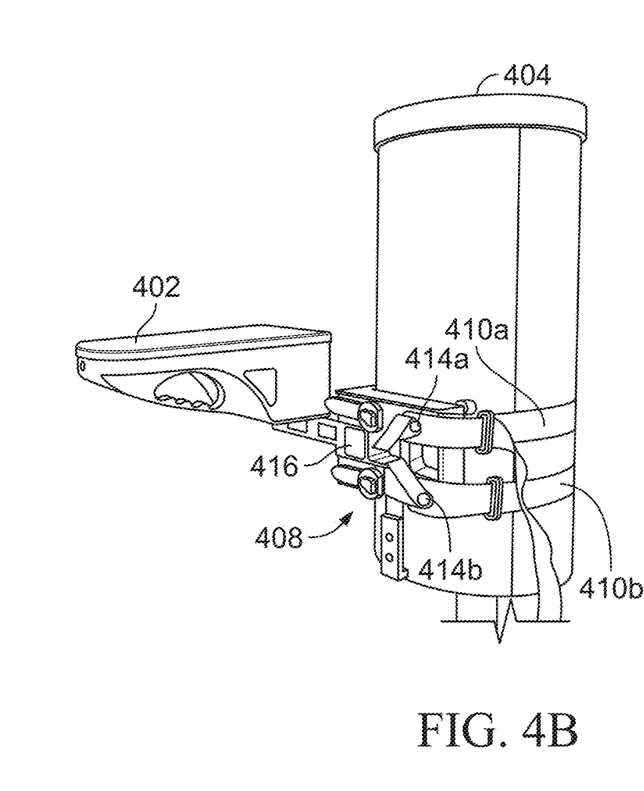

Various examples of the mount 108, e.g., lip clamps shown in FIGS. 2A-2D, strap clamps shown in FIGS. 3A-3B, and extension clamps shown in FIGS. 4A-4B are described below.

Figure 2A:
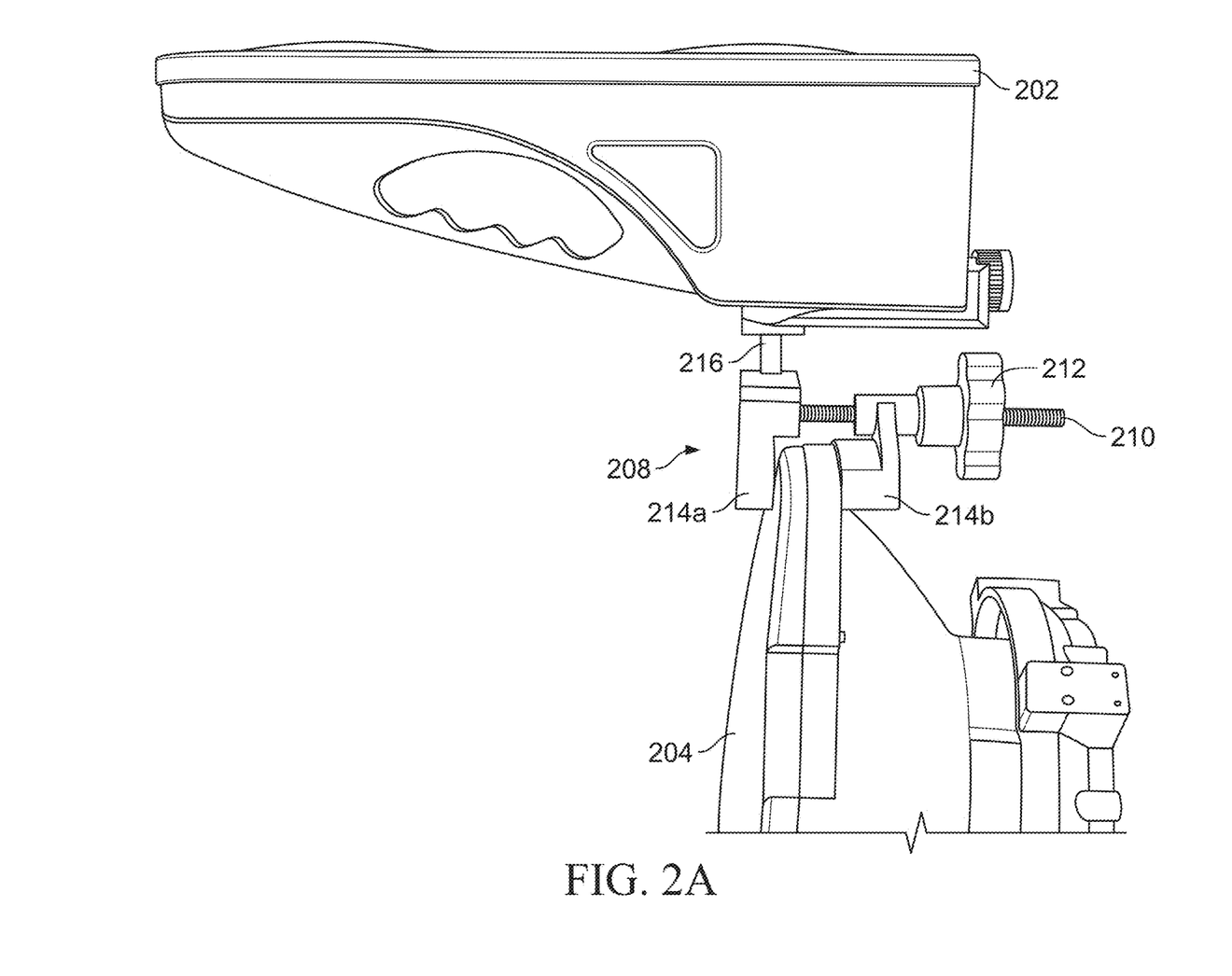
FIG. 2A shows an illustration of a lip clamp (an example of the mount) coupling an antenna alignment device with an antenna, based on the principles disclosed herein.

FIG. 2A shows an illustration of a lip clamp 208 (an example of the mount 108) coupling an antenna alignment device 202 to an antenna 204, based on the principles disclosed herein. The lip clamp 208 may include a bolt 210, an adjustment knob 212, a first lip 214*a*, a second lip 214*b*, and a housing 216 for electronic circuitry. The first lip 214*a* and the second lip 214*b* may be pushed against the body of the antenna 204 to couple the antenna alignment device 202 to the antenna 204. The adjust knob 212 may be rotated engaging the screw threads of the bolt 210 to move at least one of the lips (e.g., second lip 214*b*) such that each of the lips 214*a* and 214 are frictionally engaged with the body of the antenna 204.

For a consistent coupling of the mount 208 to the antenna 204 at different times, the engagement of the lips 214*a* and 214*b* to the body of the antenna 204 may have to be within desirable bounds. That is, the tightness of the attachment of the mount 208 to the antenna 204 may have to be consistent for couplings done at different instances. For instance, a coupling during the installation of the antenna 204 may have to have similar mechanical properties after a few months of the installation. These mechanical properties may include, for example, strain on the mount 208 (more specifically the lips 214*a* and 214*b*). Such consistency may reduce the variability between the alignment measurements performed by the antenna alignment device 202.

Figure 2B:
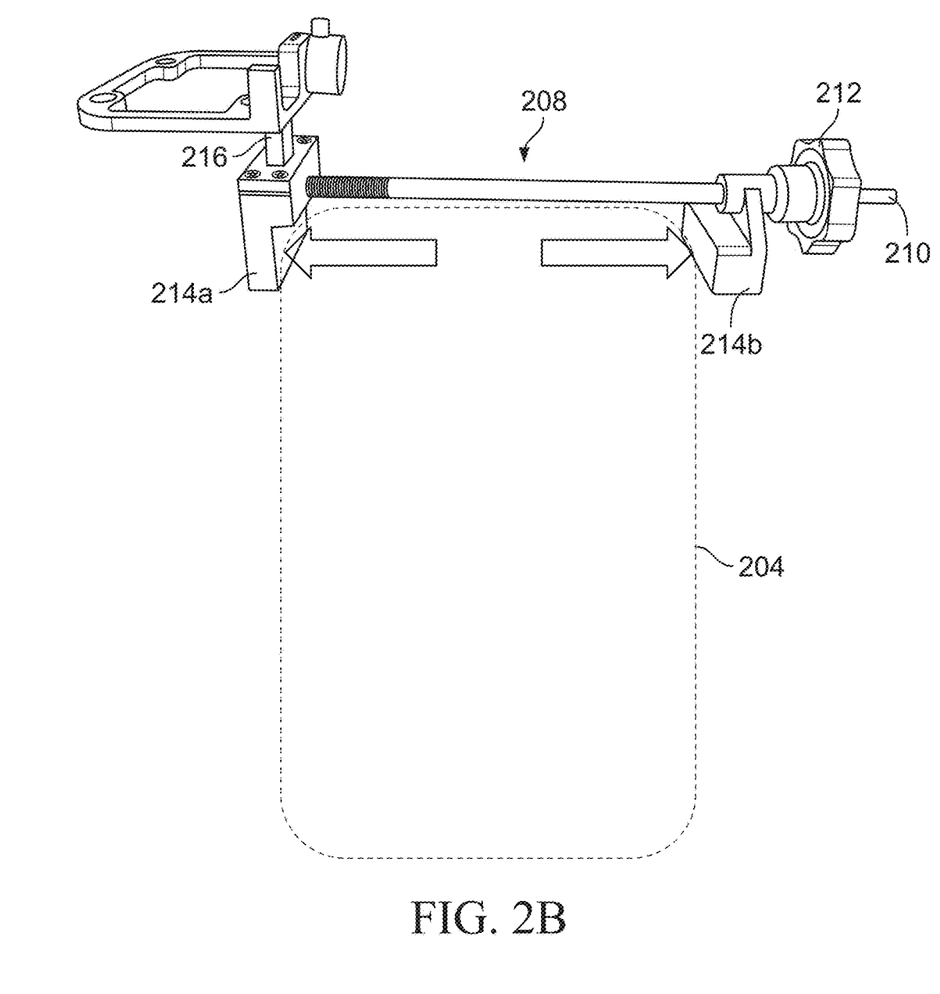
FIG. 2B shows an illustration of strain measurements of the lips of the lip clamp, based on the principles disclosed herein.

FIG. 2B shows an illustration of strain measurements of the lips 214*a* and 214*b* of the lip clamp 208, based on the principles disclosed herein. A first strain gauge or a first pressure sensor (not shown) disposed in the first lip 214*a* may measure the pressure (or push force) imparted by the antenna 204 against the first lip 214*a*. Similarly, a second strain gauge or a second pressure sensor (not shown) disposed on the second lip 214*b* may measure pressure (or push force) imparted by the antenna 204 against the second lip 214*b*. Alternatively, a single set of sensors, e.g., just the first strain gauge or the first pressure sensor, may be used. The measured strain or mechanical pressure may be transmitted by the electronic circuitry (e.g., containing a communication interface such as a Bluetooth Low Energy or Near Field Communication within the housing 216) to the antenna alignment device 202. The antenna alignment device 202 display the strain or the mechanical pressure to a user and/or determine whether the strain or the mechanical pressure is within desirable bounds.

Figure 2C:
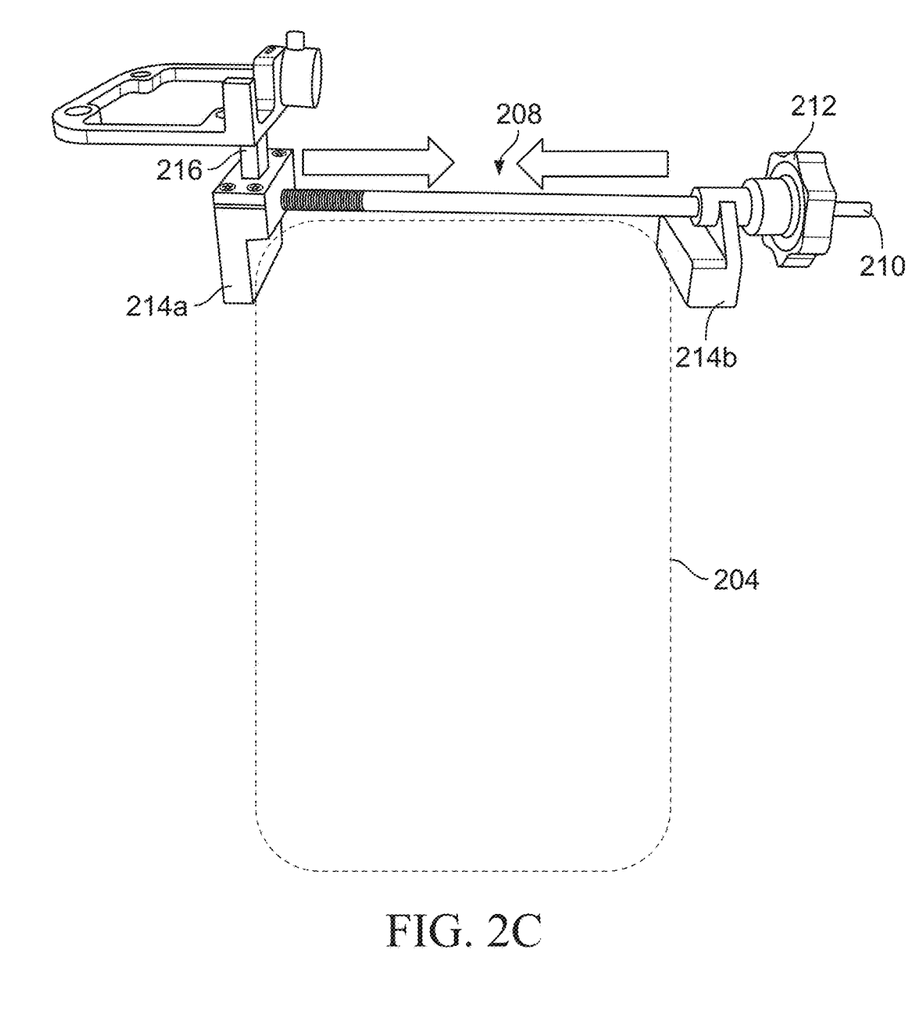
FIG. 2C shows an illustration of measuring pull forces imparted at one or more lips of a lip clamp, based on the principles disclosed herein.

FIG. 2C shows an illustration of measuring pull forces imparted at one or more of the lips 214*a* and 214*b* of the lip clamp 208, based on the principles disclosed herein. The first strain gauge or a first pull force sensor (not shown) may measure the pull force imparted by the bolt 210 to the first lip 214*a* (also can be considered pull force from the first lip 214*a* to the bolt 210). Similarly, the second strain gauge or a second pull force sensor may measure the pull force imparted by the bolt 210 to the second lip 214*b* (also can be considered pull force the second lip 214*b* to the bolt 210). Some embodiments may just use just a single strain gauge or a single pull force sensor at the first lip 214*a*. The measurements from the one or more strain gauges or the pull force sensors may be transmitted to the antenna alignment device 202, which in turn may show the measured data to the user. The antenna alignment device 202 may also determine whether the sensor data is within desirable bounds. Based on this determination, antenna alignment device 202 may provide a notification to the user to indicate a normal condition (e.g., a check mark on a screen or a green LED) or an out of bounds condition (e.g., a beep or a red LED).

Figure 2D:
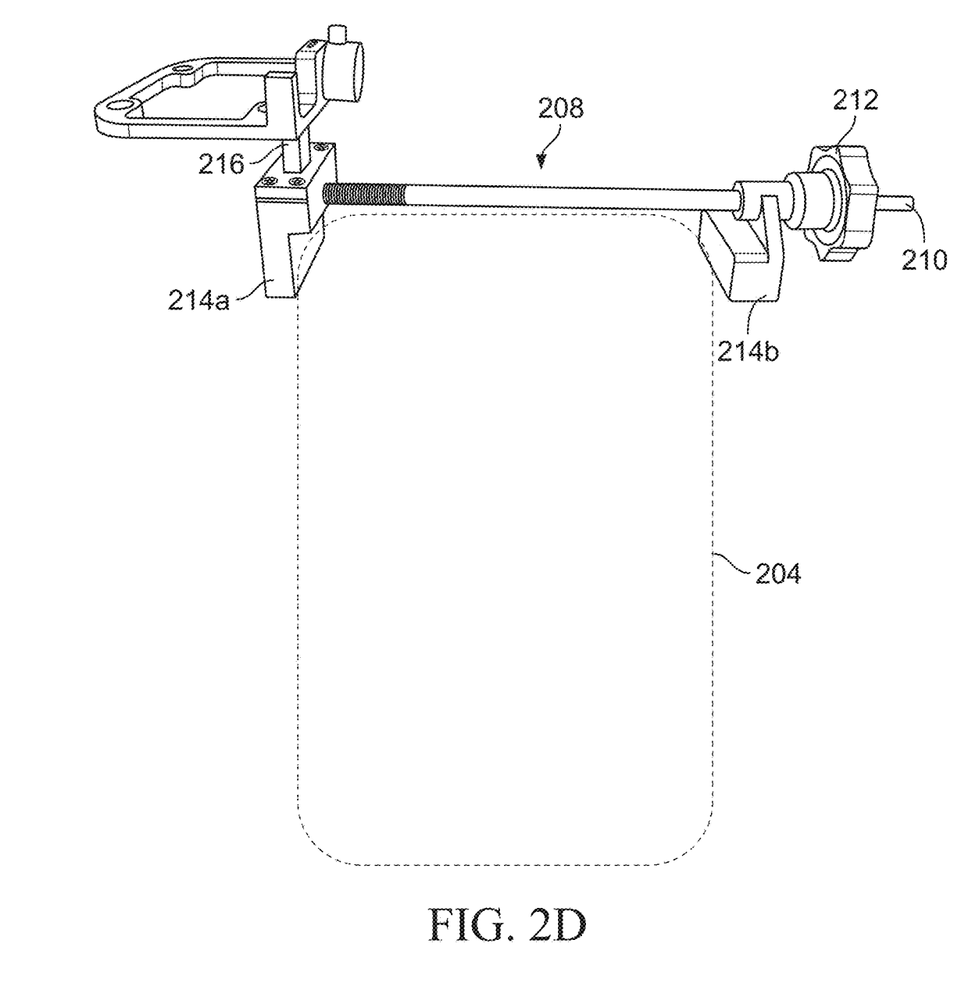
FIG. 2D shows an illustration of using accelerometers to determine whether a mount is within desirable bounds, based on the principles disclosed herein.

FIG. 2D shows an illustration of using accelerometers to determine whether the mount 208 is within desirable bounds, based on the principles disclosed herein. One or more accelerometers (not shown) may be provided within the body of the mount 208 (e.g., base of the mount 208). These accelerometers may measure orientation data (e.g. tilt and/or roll) of the mount 208 and transmit the measured data to the antenna alignment device 202. The antenna alignment device 202 may itself include one or more accelerometers. Data from the accelerometers of the mount 208 may be compared with the data from the accelerometers of the antenna alignment device 202. If the comparison yields a reasonable similarity, e.g., that the orientation of the mount 208 is similar (e.g., within a predetermined comparison threshold) to the orientation of the antenna alignment device 202, then it may be determined that the state of the mount is within desirable bounds and the antenna alignment device 202 may generate a corresponding indication.

FIGS. 3A-3B show an illustration of an extension clamp 308, coupling an antenna alignment device 302 to an antenna 304, based on the principles disclosed herein. The extension clamp 308 may include a clamp base 316, a receiving bracket 312 for receiving the antenna alignment device 302, a first post 310a that may rotate around a first swivel pin 314a, and a second post 310b that may rotate around a second swivel pin 314b. The first post 310 may be fastened to an antenna 304 facing bracket 318 using a first screw 320a and the second post 310b may be fastened to the bracket 318 using a second screw 320b. The tightness or tension generated by the screws 320a and 320b on the posts 310a and 310b, respectively, may largely determine whether the coupling between the antenna alignment device 302 and the antenna 304 is within desirable bounds.

To that end, the extension clamp 308 may include one or more pull force sensors or strain gauges in the posts 310a and 310b. The pull force sensors or strain gauges may measure the tension (or tightness) as one or more of the screws 320 and 320b are threated to the posts 310a and 310b, respectively. The data measured by the sensors may be transmitted to the antenna alignment device 302 using electronic circuitry within the clamp base 316. The antenna alignment device 302 may in turn provide the data to the user (e.g., raw numeric values that the user may compare against the desired values). Alternatively or additionally, the antenna alignment device 302 may indicate to the user that the coupling (e.g., between the antenna alignment device 302 and the antenna 304) is within bounds, e.g., through a green LED; or that the coupling is out of bounds, e.g., through a red LED.

The extension clamp may also include accelerometers. These accelerometers may generate orientation data and transmit the orientation data (e.g., using the electronic circuitry within the base 316) to the antenna alignment device 302. The antenna alignment device 302 may also include one or more accelerometers and compare the received orientation data with the orientation data generated by its own accelerometers. If both sets of data are similar (e.g., within a predetermined comparison threshold), the antenna alignment device 302 may indicate that the coupling is within desirable bounds and generate a corresponding indication. However, if the sets of data are not sufficiently similar (e.g., not within the predetermined comparison threshold), the antenna alignment device 302 may generate an indication that the coupling is outside of the desirable bounds.

FIGS. 4A-4B show an illustration of strap clamp 408 coupling an antenna alignment device 402 to an antenna 404, based on the principles described herein. The strap clamp 408 may include a first strap 410a and a second strap 410b, each of which may wrap around the antenna 404. A first ratchet mechanism 418a may be used to tighten the first strap 410a and a second ratchet mechanism 418b may be used to tighten the second strap 410b. The first strap 410a may be connected to a first strap base 414a and the second strap 410b may be connected to a second strap base 414b. Electronic components for the smart strap clamp 408 may be housed anywhere within the clamp body 416.

To determine if the coupling between the antenna alignment device 402 and the antenna 404 is within desired bounds, the first strap 410a may be provided with a first strain gauge or a first pull force sensor and the second strap 410b may be provided with a second strain gauge or a second pull force sensor. The first strain gauge or the first pull force sensor may collect strain or pull data exerted on the strap base 414a as the first strap 410a is being tightened around the antenna 404 (e.g., using the first ratchet mechanism 418a). Similarly, the second strain gauge or the second pull force sensor may collect data associated with the strain or pull force exerted on the second strap base 414b by the second strap 410b as the second strap 410b is being tightened around the antenna 404. The data collected by each of the strain gauges or the pull force sensors may be transmitted to the antenna alignment device 402, which may in turn determine, using the data, whether the coupling is within the desired bounds. The antenna alignment device may generate an indication if the coupling is within bounds and generate another indication if the coupling is out of bounds.

The mount 408 may also comprise one or more accelerometers that may collect data associated with the orientation of the mount 408. The orientation data may be transmitted to the antenna alignment device 402, which may in turn have its own accelerometers. The accelerometers of the antenna alignment device 402 may measure its orientation and the measured orientation of the antenna alignment device 402 may be compared with the measured orientation of the mount. If both of these orientations are similar (e.g., within a predetermined comparison threshold), then it may be determined that the coupling is within bounds. If these orientations are not sufficiently similar (e.g., not within the predetermined comparison threshold), then it may be determined that the coupling is not within bounds.

Figure 5:
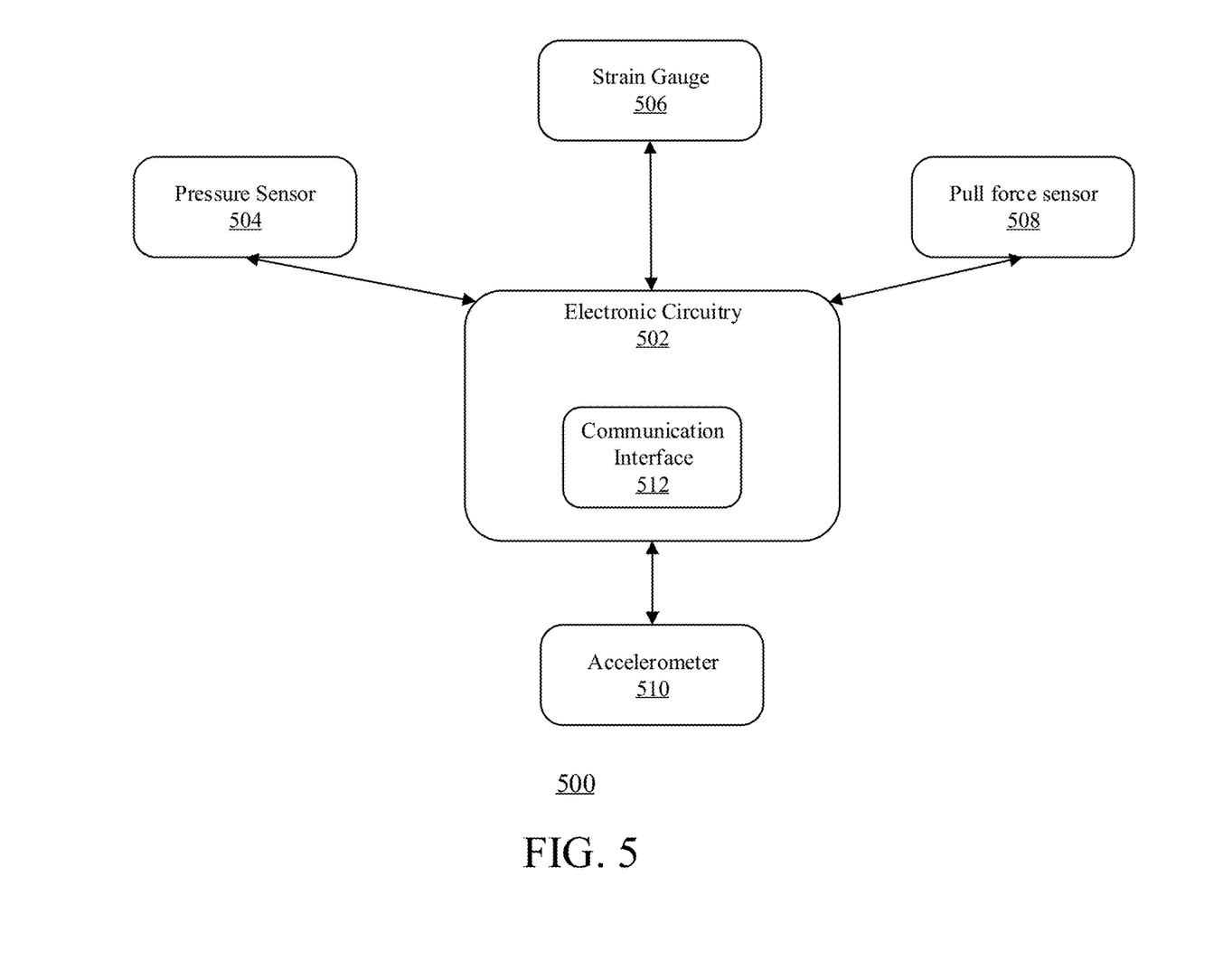
FIG. 5 shows an illustrative architecture of a mount, based on the principles disclosed herein.

FIG. 5 shows an illustrative architecture 500 of a mount, based on the principles disclosed herein. As shown, the architecture 500 may comprise electronic circuitry 502, a pressure sensor 504, a strain gauge 506, pull force sensor 508, and an accelerometer 510. These components are merely intended as examples and architectures with additional, alternative, or fewer number of components should also be considered within the scope of this disclosure. Furthermore, although single components (e.g., the pressure sensor 504) are shown, architectures with multiple components of the same type (e.g., multiple pressure sensors 504) should also be considered within the scope of this disclosure.

The electronic circuitry 502 may include any type of discrete and/or integrated electronic components. For example, the electronic circuitry 502 may include a printed circuit board, an integrated circuit, and/or other discrete or integrated circuit components. A communications interface 512 may be within the electronic circuitry 502 and may include components for supporting wired and/or wireless communications with other devices such as an antenna alignment device or a mobile phone. For instance, the communication interface 512 may support Bluetooth Low Energy protocol and/or Near Field Communications protocol. Using these protocols, the communications interface may transmit the measurements made by the sensors and gauges within the architecture 500. For wired connections, the communication interface 512 may be associated with a port that one or more wires may couple to at one end, with the other end of the wires being coupled to the antenna alignment device. The data from the mount may be transmitted to the antenna alignment device using this wired connection. Another wired connection may be used to transmit power from the antenna alignment device to the mount. In some embodiments, a wired connection may be used for both the power transfer from the antenna alignment device to the mount and data transfer from the mount to the antenna alignment device, e.g., through a power line communication.

The pressure sensor 504 may be any kind of sensor that may measure mechanical pressure (e.g., push) being applied to the sensor. For instance, the pressure sensor 504 may comprise a transducer that may convert a mechanical displacement due to the mechanical pressure into an electronic signal or an electrical current that may be picked up by the electronic circuitry 502. The electronic signal or the electrical current may therefore indicate the level of mechanical pressure measured by the pressure sensor 504.

The strain gauge 506 may be any kind of gauge or a sensor that may measure pull force or push force exerted to the gauge 506. The push force may generate a mechanical displacement in one direction, and the displacement may be converted into an electronic signal or an electrical current. The pull force may generate a mechanical displacement in another direction, and the displacement may be converted into another electronic signal or another electrical current. These electronic signals and/or electrical currents may be provided to the electronic circuitry 502, which may in turn use the communication interface 512 to transmit the corresponding data to an antenna alignment device or another device (e.g., a mobile phone).

The pull force sensor 508 may be any kind of sensor that may measure a pull force being exerted on the pull force sensor 508. For instance, the pull force sensor 508 may include a mechanical component that may be displaced by the pull force, and this displacement may be transmitted into an electronic signal or an electrical current. This generated electronic signal, or the electrical current may then be transmitted to the electronic circuitry 502, which may then use the communication interface to transmit the corresponding data to an antenna aligner or another device (e.g., a mobile phone).

The accelerometer 510 may be any kind of sensor that may determine an orientation of a device (e.g., a mount) having the architecture 500. The accelerometer may measure differential gravity at its components, and, based on the differential gravity determine the orientation of the device. The accelerometer 510 may then transmit the determined orientation information to the electronic circuitry 502, which may in turn use the communication interface 512 to transmit the corresponding data to the antenna alignment device or another device (e.g., a smartphone).

In operation, data that is transmitted by the electronic circuitry 502 using the communication interface 512 may be used by the receiving device (e.g., antenna aligner or a smartphone) to determined whether the coupling provided by the mount is within the desired bounds. The receiving device may transmit fetch or interrogate signals, acknowledgement signals, and/or any other types of signals to the different components of the architecture (e.g., electronic circuitry 502).

Figure 6:
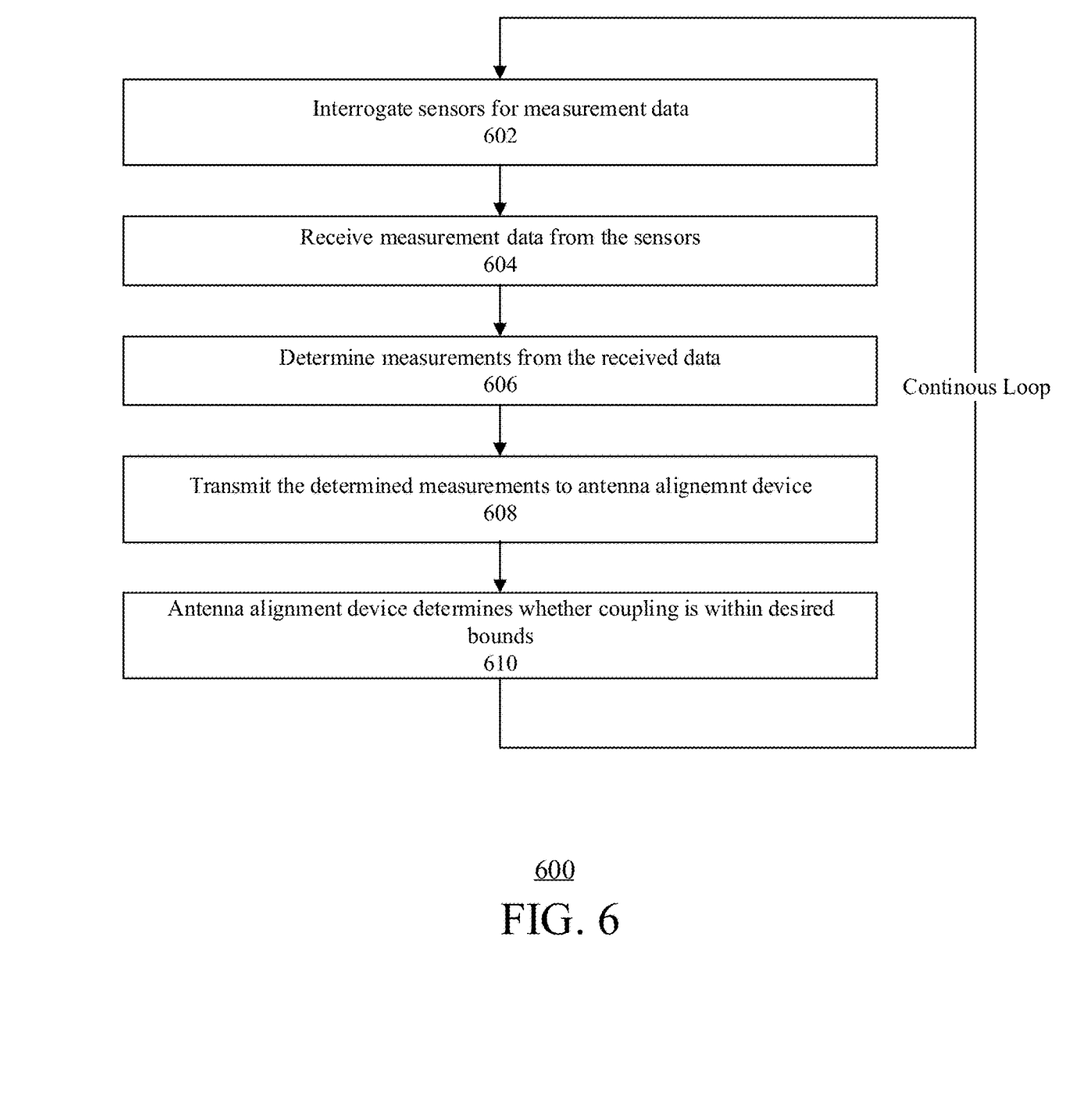
FIG. 6 shows a flow diagram of an illustrative method 600 of determining whether coupling between an antenna alignment device and an antenna is suitable, based on the principles disclosed herein.

FIG. 6 shows a flow diagram of an illustrative method 600 of determining whether coupling between an antenna alignment device and an antenna is suitable, based on the principles disclosed herein. The method 600 may be performed by electronic circuitry within a mount (e.g., electronic circuitry 502 shown in FIG. 5) and an antenna alignment device. It should also be understood that the steps shown in FIG. 6 and described herein are merely examples, and methods with additional, alternative, or fewer number of steps should also be considered within the scope of this disclosure.

The method may begin at step 602, where sensors may be interrogated for measurement data. For instance, the electronic circuitry may transmit signals for the sensors to activate and gather measurement data. The gathered data may be associated with pull force, push force, and/or orientation as described above. At step 604, the electronic circuitry may receive the measurement data from the sensors. For instance, the electronic circuitry may be a printed circuit board comprising one or more sensors, and the measurements generated by the sensors may be read by other components in the printed circuit board.

At step 606, the measurements from the measurement data may be determined. For instance, the electronic circuitry may perform further processing on the raw data received from the sensors (e.g., an electronic signal) and extract a measurement (e.g., amount of pull force detected) from the raw data. At step 608, the electronic circuitry may transmit the determined measurements to the antenna alignment device. At step 610, the antenna alignment device may determine whether the coupling is within desired bounds based on the measurements. For instance, the antenna alignment device may determine whether the measured pull and push forces are within a desired range, and/or that the orientation data received from the electronic circuitry is similar to the orientation data generated by one or more accelerometers of the antenna alignment device itself.

These steps may run in a continuous loop to provide a real-time feedback to a user as to the state of the coupling. The real time feedback may include an indication that the coupling is normal and within desired bounds. Alternatively, the real time feedback may include an indication of an error condition, which may be provided to the user as an audible signal or as a visual indication such as a red LED.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A mount configured to couple an antenna alignment device to an antenna, the mount comprising:
   a clamp configured to engage with an external surface of the antenna, receive the antenna alignment device that is separate from the mount, and maintain coupling between the antenna alignment device and the antenna;
   one or more sensors configured to measure mechanical forces imparted by the surface of the antenna to corresponding portions of the clamp when the antenna alignment device is coupled to the antenna using the mount;

one or more accelerometers configured to determine an orientation of the clamp when the antenna alignment device is coupled to the antenna using the mount; and electronic circuitry configured to transmit data indicating the measured mechanical forces and the determined orientation to the antenna alignment device adapted to determine whether a tightness of the coupling between the antenna alignment device and the antenna is within predetermined bounds.

2. The mount of claim 1, wherein the one or more sensors comprise a strain gauge.

3. The mount of claim 1, wherein the one or more sensors comprise at least one of a pull force sensor or a pressure sensor.

4. The mount of claim 1, wherein the clamp comprises at least one of a lip clamp, an extension clamp, or a strap clamp.

5. The mount of claim 1, wherein:
the clamp comprises a first lip and a second lip configured to engage the external surface of the antenna from diametrically opposite sides; and
the one or more sensors comprise a strain gauge or a pressure sensor configured to measure a push force imparted by the external surface of the antenna to at least one of the first lip or the second lip.

6. The mount of claim 1, wherein:
the clamp comprises:
a first lip and a second lip configured to engage the external surface of the antenna from diametrically opposite sides;
a bolt engaged to both the first lip and the second lip; and
the one or more sensors comprise:
a strain gauge or pull force sensor configured to measure a pull force to the bolt imparted by at least one the first lip or the second lip based on a corresponding engagement to the external surface of the antenna.

7. The mount of claim 1, wherein:
the clamp comprises:
a bracket configured to engage the external surface of the antenna;
at least one pole configured to be coupled to the bracket using a screw; and
the one or more sensors comprise:
a strain gauge or a pull force sensor configured to measure a pull force imparted to the at least one pole by tightening of the screw.

8. The mount of claim 1, wherein:
the clamp comprises at least one strap configured to wrap around the external surface of the antenna; and
the one or more sensors comprise a strain gauge or a pull force sensor configured to measure a pull force imparted by the external surface of the antenna to the at least one strap.

9. The mount of claim 1, wherein the electronic circuitry is configured to transmit the data using at least one of Bluetooth Low Energy protocol, Near Field Communication protocol, or a wired connection.

10. A system comprising:
an antenna alignment device; and
a mount configured to couple the antenna alignment device to an antenna and comprising:
a clamp configured to engage with an external surface of the antenna and maintain coupling between the antenna alignment device and the antenna;
one of more sensors configured to measure mechanical forces imparted by the surface of the antenna to corresponding portions of the clamp;
one or more accelerometers configured to determine an orientation of the clamp;
wherein the antenna alignment device is configured to:
receive data indicating the measured mechanical forces and the determined orientation; and
determine, based on the received data, whether the coupling between the antenna alignment device and the antenna is within predetermined bounds.

11. The system of claim 10, wherein:
the antenna alignment device comprises one or more second accelerometers configured to determine the orientation of the antenna alignment device; and
the antenna alignment device is configured to determine whether the coupling between the antenna alignment device and the antenna is within the predetermined bounds comprises by comparing the orientation of the clamp with the orientation of the antenna alignment device.

12. The system of claim 10, wherein, in response to determining that the coupling between the antenna alignment device and the antenna is within the predetermined bounds, the antenna alignment device is configured to generate an indication of a normal coupling condition.

13. The system of claim 10, wherein, in response to determining that the coupling between the antenna alignment device and the antenna is not within the predetermined bounds, the antenna alignment device is configured to generate an indication of an alarm condition.

14. The system of claim 13, wherein the indication of the alarm condition comprises an audible signal.

15. The system of claim 13, wherein the indication of the alarm condition comprises a visual indication.

16. The system of claim 10, wherein the antenna alignment device is further configured to display the received data indicating the measured mechanical forces and the determined orientation.

17. The system of claim 10, wherein the antenna alignment device is configured to receive the data using at least one of Bluetooth Low Energy protocol, Near Field Communication protocol, or a wired connection.

18. The system of claim 10, wherein the one or more sensors comprise at least one of a strain gauge, a pull force sensor, or a pressure sensor.

19. The system of claim 10, wherein the clamp comprises at least one of a lip clamp, an extension clamp, or a strap clamp.

* * * * *